US012565350B2

(12) United States Patent
Middleton et al.

(10) Patent No.: US 12,565,350 B2
(45) **Date of Patent: *Mar. 3, 2026**

(54) LABEL PRINTING SYSTEM AND METHOD

(71) Applicant: Metas, LLC, Grand Rapids, MI (US)

(72) Inventors: Brady Middleton, Grand Rapids, MI (US); Steve Middleton, Grand Rapids, MI (US); Mike Kaman, Grand Rapids, MI (US); Blake Middleton, Grand Rapids, MI (US)

(73) Assignee: Metas, LLC, Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,826

(22) Filed: Jun. 7, 2024

(65) Prior Publication Data

US 2024/0343440 A1 Oct. 17, 2024

Related U.S. Application Data

(63) Continuation of application No. 16/730,391, filed on Dec. 30, 2019.

(Continued)

(51) Int. Cl.

| | |
|---|---|
| ***B65C 9/40*** | (2006.01) |
| ***B41J 3/407*** | (2006.01) |
| ***B65C 9/00*** | (2006.01) |

(52) U.S. Cl.

CPC ............... *B65C 9/40* (2013.01); *B41J 3/4075* (2013.01); *B65C 9/0065* (2013.01); *B65C 2009/408* (2013.01)

(58) Field of Classification Search

None

See application file for complete search history.

(56) References Cited

U.S. PATENT DOCUMENTS

2003/0056869 A1* 3/2003 Tate .......................... B65C 9/42 156/64
2003/0144853 A1 7/2003 Stehouwer (Continued)

FOREIGN PATENT DOCUMENTS

EP 26000237 A2 6/2013
GB 2594867 A 11/2021

(Continued)

OTHER PUBLICATIONS

Indonesia Second Substantive Examination Report dated Dec. 24, 2024, Application No. P00202104945.

(Continued)

*Primary Examiner* — Matthew G Marini

(74) *Attorney, Agent, or Firm* — The Dobrusin Law Firm, P.C.

(57) ABSTRACT

A label printing system and method are generally provided. The label printing system may be optimized for deployment at a user location. The label printing system may comprise a label print engine configured to receive a formatted digital data related to a label and print the related label on media. The label printing system may further comprise a finishing machine configured to receive a printed label from the label print engine and perform a finishing task on one or more printed labels. A central processor may be connected to the label print engine and the finishing machine and configured to send label print and finishing information to the label print engine and the finishing machine respectively. A user portal may be connected to the central processor. The user portal is configured to send an art file related to a label to be printed to the central processor. The central processor is configured to receive the art file and generate a formatted digital data based on the art file to be sent to the print engine for printing of a label.

5 Claims, 19 Drawing Sheets

Related U.S. Application Data

(60) Provisional application No. 62/785,932, filed on Dec. 28, 2018.

(56) References Cited

U.S. PATENT DOCUMENTS

| | | | | |
|---|---|---|---|---|
| 2003/0229543 | A1 | 12/2003 | Zimmerman | |
| 2009/0287806 | A1* | 11/2009 | Hamilton, II | G06F 3/1226 358/1.15 |
| 2011/0063654 | A1* | 3/2011 | Simske | G06F 3/126 358/1.15 |
| 2014/0156472 | A1 | 6/2014 | Stuntebeck et al. | |
| 2015/0039528 | A1 | 2/2015 | Minogue | |
| 2015/0156342 | A1 | 6/2015 | Fries et al. | |
| 2016/0350624 | A1 | 12/2016 | Liguori et al. | |
| 2018/0103176 | A1 | 4/2018 | Van Vonderen | |
| 2018/0307447 | A1 | 10/2018 | Tufano et al. | |
| 2020/0377252 | A1 | 12/2020 | Middleton et al. | |

FOREIGN PATENT DOCUMENTS

| | | | |
|---|---|---|---|
| JP | 2003296053 | A | 10/2003 |
| JP | 7522459 | B2 | 2/2022 |

OTHER PUBLICATIONS

EP Communication dated Jan. 29, 2024, Application No. 19905895.9.
Great Britain Examination Report dated Apr. 14, 2023, Application No. GB2110406.2.
IN Exam Report dated Feb. 10, 2023, Application No. 202137028899.
EP Extended Search Report dated Aug. 9, 2022, Application No. 19905895.9.

* cited by examiner

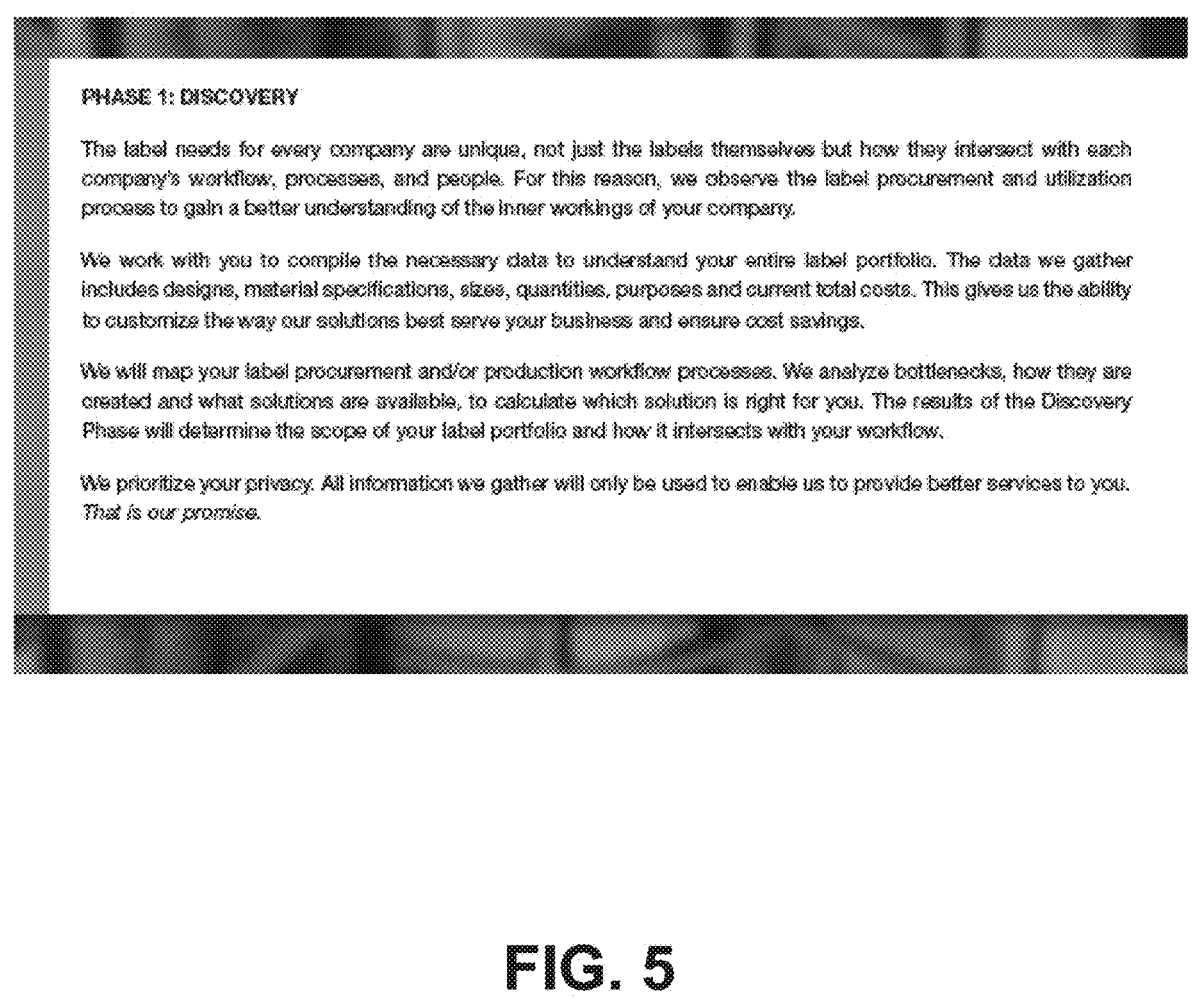

PHASE 1: DISCOVERY

The label needs for every company are unique, not just the labels themselves but how they intersect with each company's workflow, processes, and people. For this reason, we observe the label procurement and utilization process to gain a better understanding of the inner workings of your company.

We work with you to compile the necessary data to understand your entire label portfolio. The data we gather includes designs, material specifications, sizes, quantities, purposes and current total costs. This gives us the ability to customize the way our solutions best serve your business and ensure cost savings.

We will map your label procurement and/or production workflow processes. We analyze bottlenecks, how they are created and what solutions are available, to calculate which solution is right for you. The results of the Discovery Phase will determine the scope of your label portfolio and how it intersects with your workflow.

We prioritize your privacy. All information we gather will only be used to enable us to provide better services to you. *That is our promise.*

FIG. 5

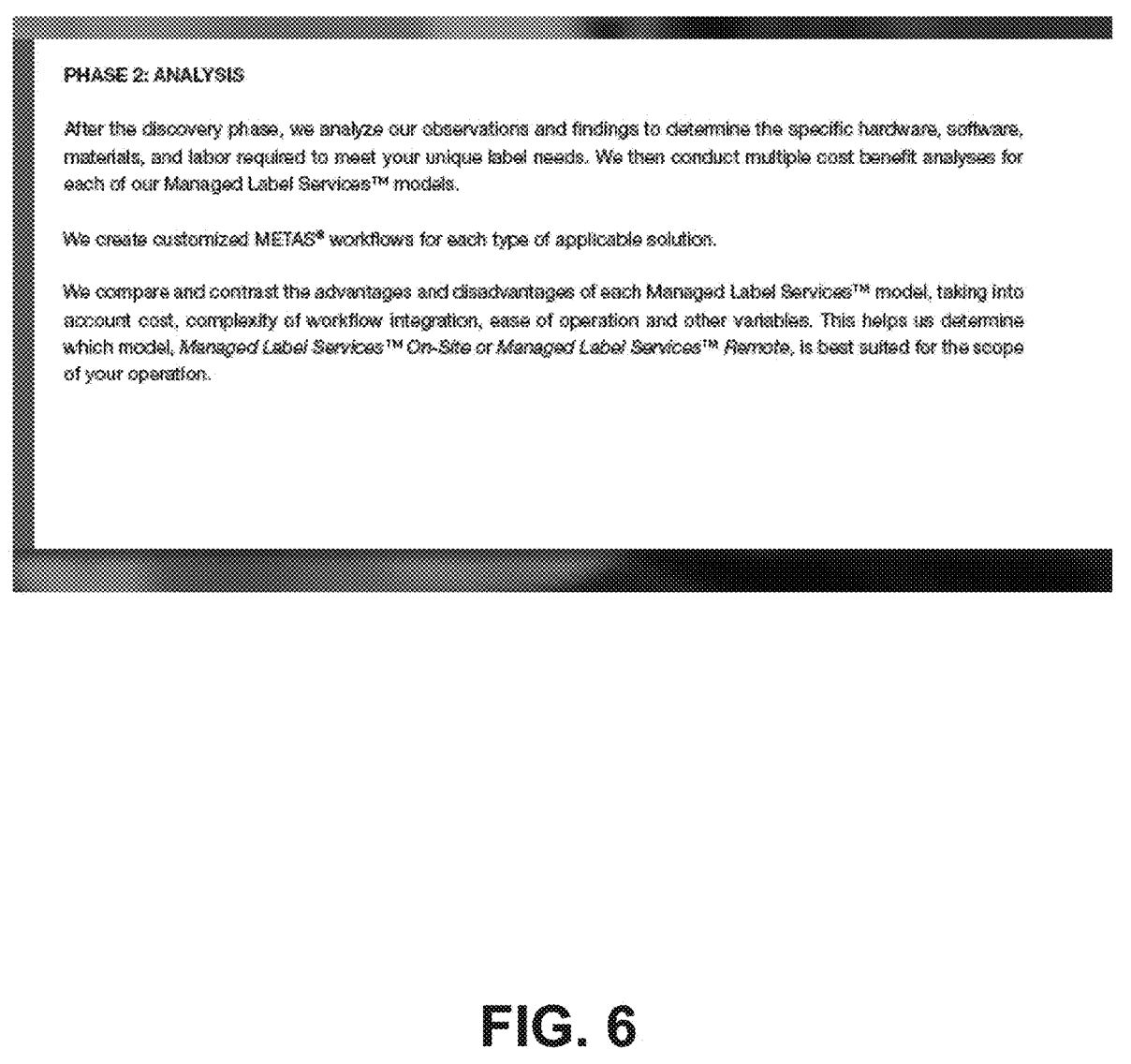

PHASE 2: ANALYSIS

After the discovery phase, we analyze our observations and findings to determine the specific hardware, software, materials, and labor required to meet your unique label needs. We then conduct multiple cost benefit analyses for each of our Managed Label Services™ models.

We create customized METAS® workflows for each type of applicable solution.

We compare and contrast the advantages and disadvantages of each Managed Label Services™ model, taking into account cost, complexity of workflow integration, ease of operation and other variables. This helps us determine which model, *Managed Label Services™ On-Site or Managed Label Services™ Remote*, is best suited for the scope of your operation.

FIG. 6

Managed Label Services™ utilizes the latest technology together with cutting edge processes to help you understand and control your labels, their cost, and related workflow. Managed Label Services™ can save you money, increase efficiency, productivity, minimize your carbon footprint, and reduce waste.

Sound too good to be true? Inspired by 60 years of print and label production experience, METAS® has developed forward thinking tools and services that can be customized and applied to your specific needs. We give you the power of control from beginning to end.

OUR APPROACH IS TARGETED, TRANSPARENT AND TRUSTED.

FIG. 14

LABEL PRINTING SYSTEM AND METHOD

CROSS-REFERENCE TO RELATED APPLICATION

This application claims priority to U.S. Provisional Patent Application No. 62/785,932 filed on Dec. 28, 2018 and entitled LABEL PRINTING SYSTEM AND METHOD, which is hereby incorporated by reference.

FIELD OF INVENTION

The present invention generally relates to a system and method of label printing and more specifically to a customized system for label printing and a method of customizing the system.

BACKGROUND

Label printing has long been an outsourced service for companies, even companies with high volume labeling needs. This is in large part due to the complexities involved with designing, printing, and finishing labels, and the processes involved with making changes to such labels. Traditionally, label printing required the use of expensive and precise tools to imprint layers of ink on a given media. Despite developments in digital label printing, many companies continue to outsource all label printing services.

One issue that many companies confront when dealing with label management is how to incorporate all of the necessary technology to address their labeling needs. Often times companies do not have the knowledge to determine which print engines, finishing machines, and other technology is needed to address all of their labeling needs.

Another issue that arises when companies attempt to bring labeling services in house is that they are not able to effectively and efficiently make necessary changes to the labels. This can be due to lack of software that properly integrates with the machinery, as well as other issues.

Accordingly, an improved method and systems for gathering, creating, producing, managing, and tracking labels and providing labeling solutions and related information are needed in the industry.

SUMMARY

A label printing system and method are generally provided. The label printing system may be optimized for deployment at a user location. The label printing system may comprise a label print engine configured to receive formatted digital data related to a label and print the related label data on media. The label printing system may further comprise a finishing machine configured to receive a printed label from the print engine and perform a finishing or converting task on one or more printed labels. A central processor may be connected to the label print engine and the finishing machine and configured to send label print and finishing information to the label print engine and the finishing machine respectively. A user portal may be connected to the central processor. The user portal is configured to send an art file or label related data to be printed to the central processor. The central processor is configured to receive the art file and generate a formatted digital data based on the art file to be sent to the print engine.

In an embodiment the central processor may be configured to monitor and receive information from an inventory system related to label concepts, media, ink, and other products used by hardware within the label printing system. The inventory system may be configured to monitor inventory levels both at a user location and off site including at various points along the supply chain. The inventory system may further receive information related to labeling and inventory needs as well as other customer and sales information.

In an embodiment the central processor may be configured to generate an optimized label production job to minimize cost, time, power consumption, and/or other variables. The optimized label production job may be determined based on at least one of: characteristics of any print engines connected to the central processor, including speed, and power consumption characteristics; ink consumption of any print engines connected to the central processor; finishing processes needed to be performed by a finishing machine, including cutting, application of finishing coatings, and removal of waste; speed and power consumption of a finishing machine connected to the central processor; availability and cost of media in an inventory system; and availability and cost inks in an inventory system.

In an embodiment, a method of determining components of a label printing network is provided. The method may include the steps of discovering label needs of a client, including technical, business, cost, power, and other related needs. The customer or user label needs may then be compared with characteristics of known hardware devices, consumable products, and the like, to determine a proposed system. The proposal may include cost considerations as well as contract proposals that reduce cost estimations to label per foot pricing.

BRIEF DESCRIPTION OF THE DRAWINGS

The operation of the invention may be better understood by reference to the detailed description taken in connection with the following illustrations, wherein:

FIG. 5 illustrates an overview of the discovery phase of a managed label services program;

FIG. 6 illustrates an overview of the analysis phase of a managed label services program;

FIG. 14 illustrates a summary of a managed label services program;

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

A label production system and method for label creation and production and method for customizing a label printing system are generally provided. The label printing system may be configured to create, configure, print, cut, and finish customized labels, as described in further detail herein.

The label printing system may include a print engine. The print engine may generally be configured to receive a label media and print desired labels onto the media. The print engine may be configured to receive a digital image or media file and print the image onto the label media.

The label printing system may include a finishing machine. The finishing machine may be generally configured to cut printed labels from the media and apply desired coatings or other finishing to the labels.

In an embodiment, the label printing system may include a software. The software may be generally configured to receive any type of input related to a new label creation, such as but not limited to a digital print file, and convert the file to a usable format for use and application by the print engine. The software may further allow configuration of various options and features of the print engine, and described in further detail herein.

Figure 1:
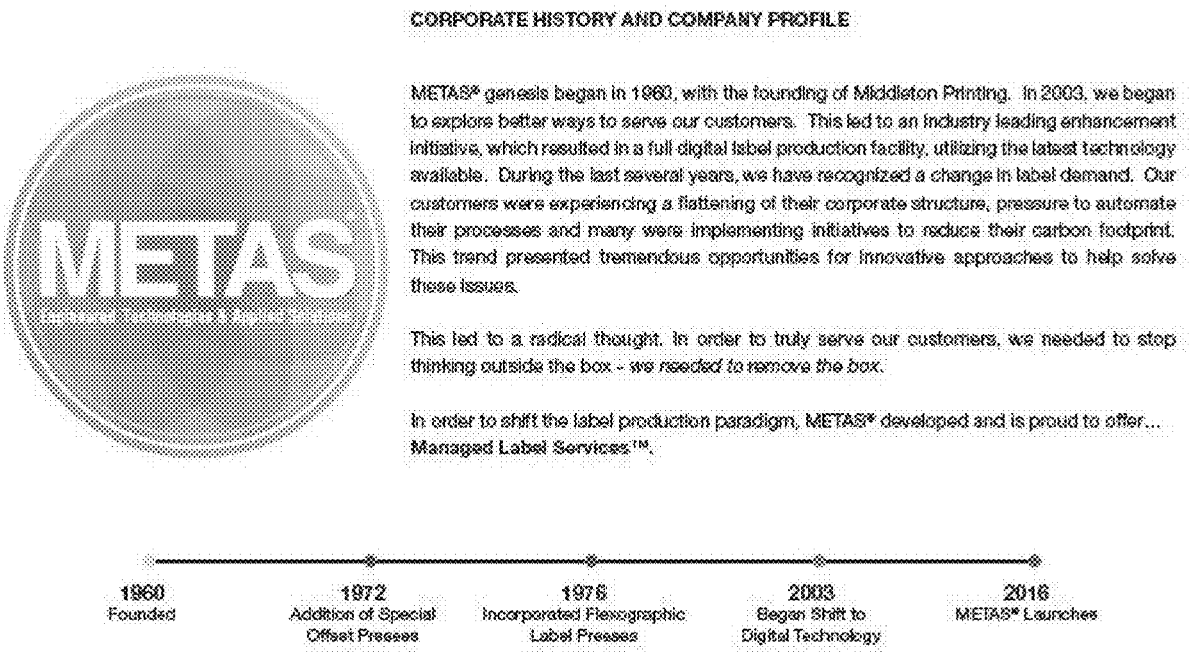
FIG. 1 illustrates a corporate history for a company that provides managed label services.

With reference to FIG. 1, the managed label services may be provided by a company having a history with providing labeling technology and services. FIG. 1 provides a description and timeline for a company having a history of providing labeling services.

Figure 2:
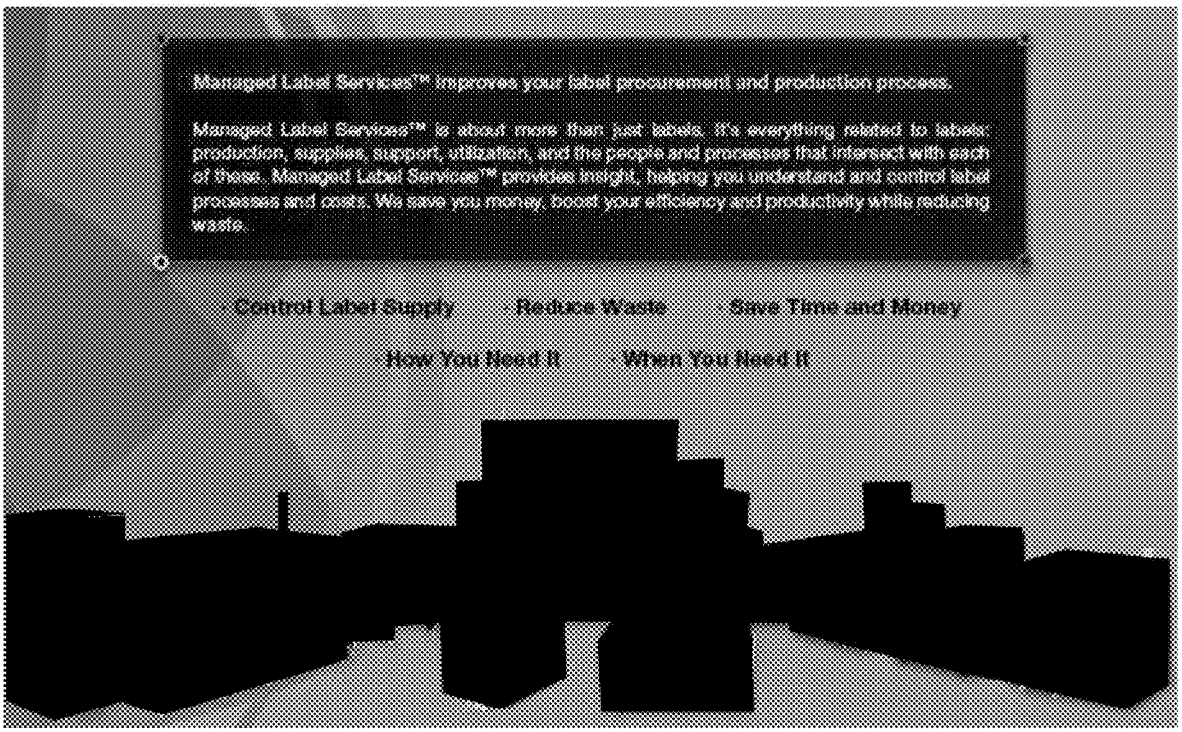
FIG. 2 illustrates a variety of machinery, including print engines and finishing machines, used for managed label services.

FIG. 2 provides an overview of what is provided under managed label services, and illustrates a series of example machines that may be used for implementing managed label services. Managed label services programs may include providing machines for production, supplies, support, know-how on utilization and optimization, as well as other services. The program helps users control costs through optimizing usage of media, optimizing costs schemes, and other ways as well. FIG. 2 illustrates example machines, including print engines, finishing machines, and other machines, that may be purchased or used by a client for implementation of managed label services. It will be appreciated that the machines illustrated in FIG. 2 are examples of machines that may be selected, and other machines may be used to accomplish the goals of managed label services.

Figure 3:
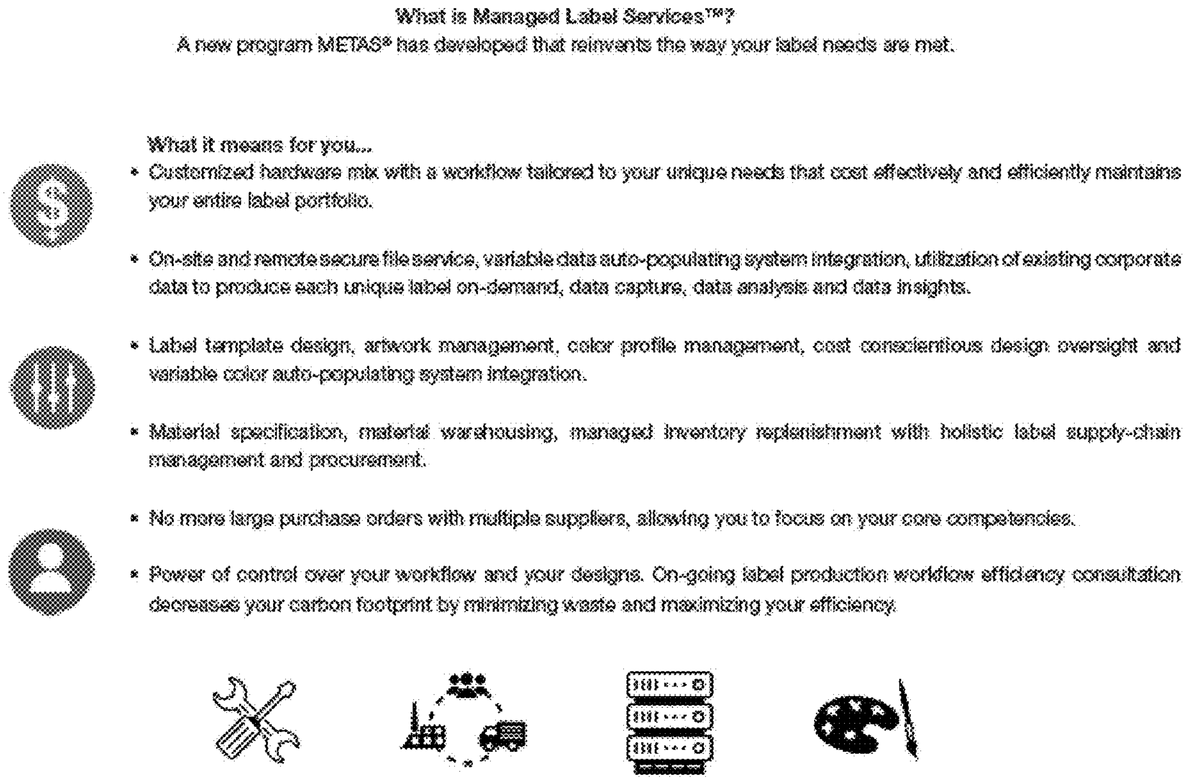
FIG. 3 illustrates a list of services offered under a managed label services program.

FIG. 3 provides a bullet point list of the key elements of a managed label services program. The elements include: customized hardware tailored to the unique needs of a client's workflow and labeling requirements; on site remote and secure file service to allow full analysis of client labeling needs; management of labeling design and artwork to allow for full customization of labeling as needed by clients; material management to efficiently optimize material usage and reduce material costs; supplier management to effectively leverage supplier relationships; and power management to reduce both power costs and carbon footprint.

Figure 4:
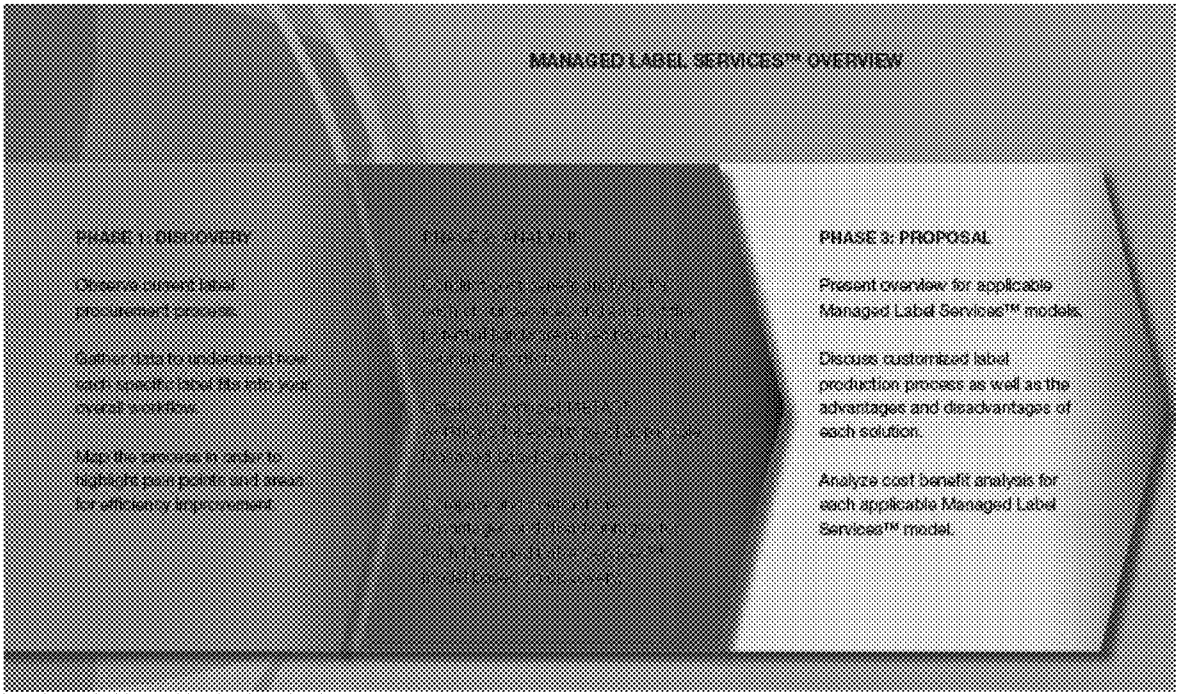
FIG. 4 illustrates phases of a managed label services program.

FIG. 4 sets forth an overview of the three phases of the managed label services program. These phases include Discovery, Analysis, and Proposal, as discussed in the subsequent FIGS.

FIG. 5 provides a deeper description of the discovery process. The discover process generally includes observation and analysis of a client's label procurement and utilization processes as well as the client's label portfolio in order to optimize the client's material usage, costs, and process efficiency.

FIG. 6 provides a further description of the analysis process for a managed label services program. The analysis process includes numerous cost benefit and efficiency analyses to determine the best hardware, machinery, and software for the given client. The analysis further includes creation of a customized work flow and comparison with other programs and methods, as well as analysis of material and media usage.

Figure 7:
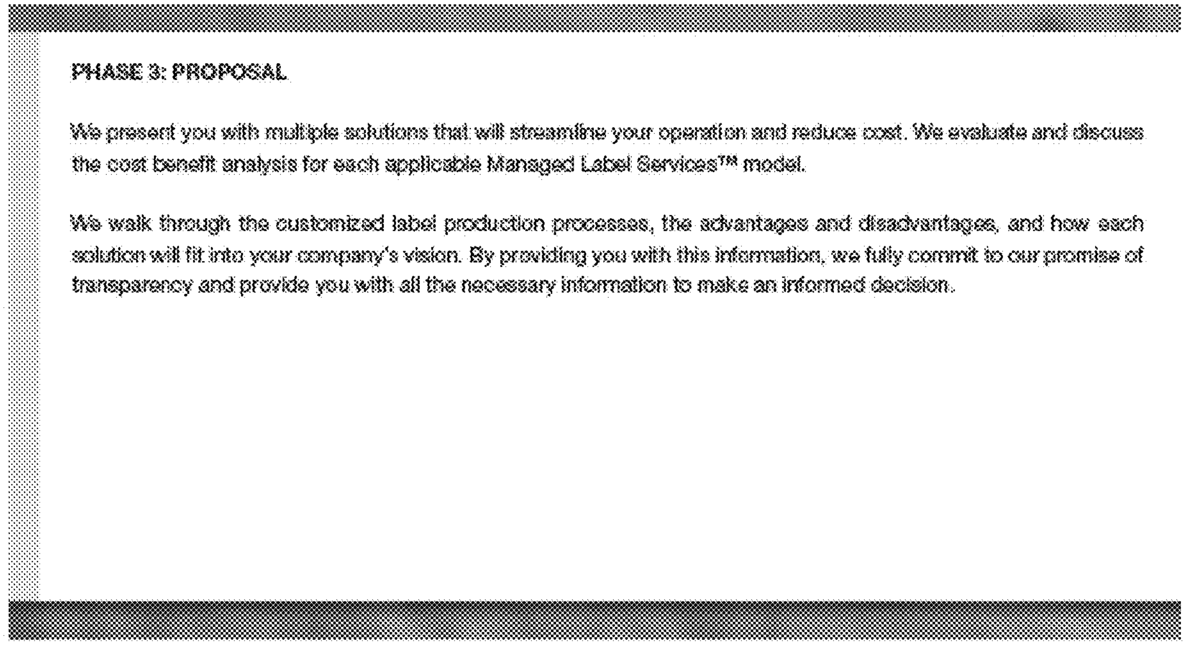
FIG. 7 illustrates an overview of the proposal phase of a managed label services program.
Figure 8:
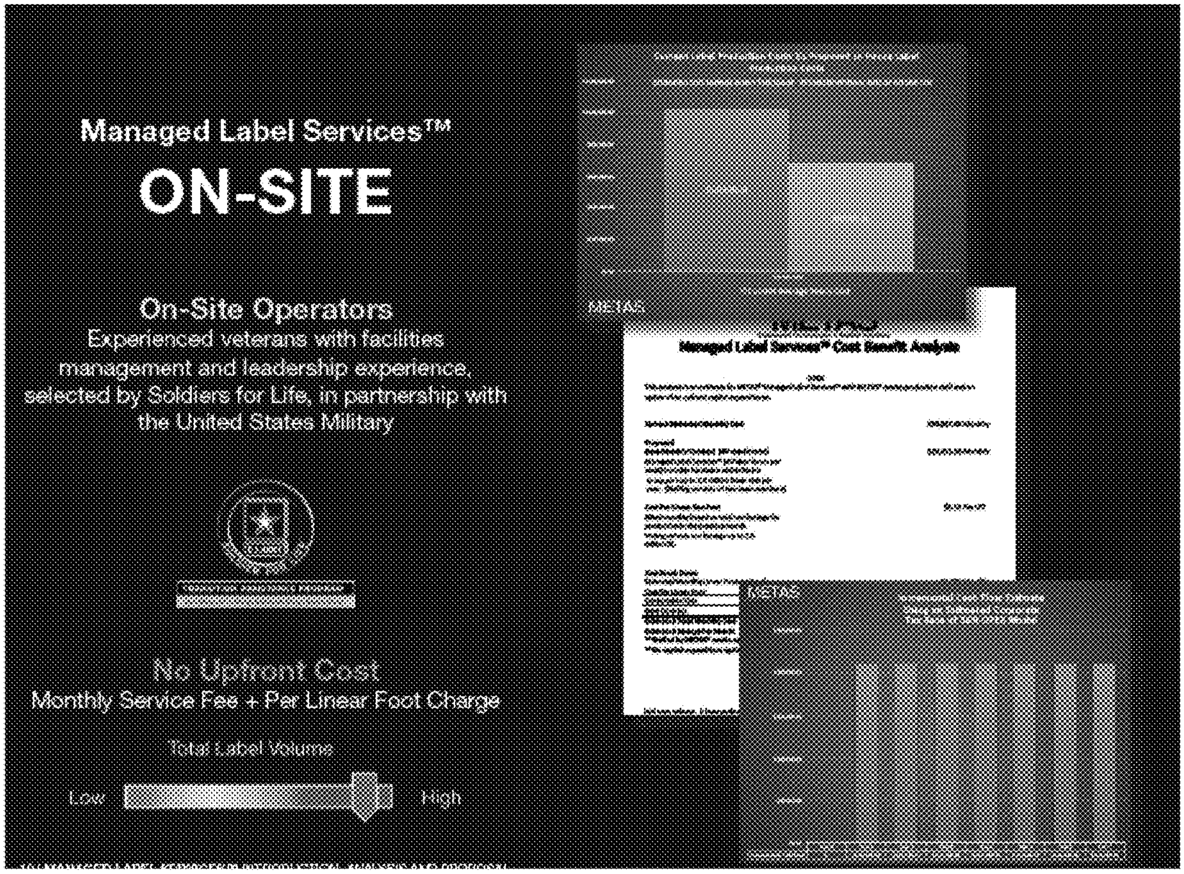
FIG. 8 illustrates advantages of using a managed label services program.
Figure 9:
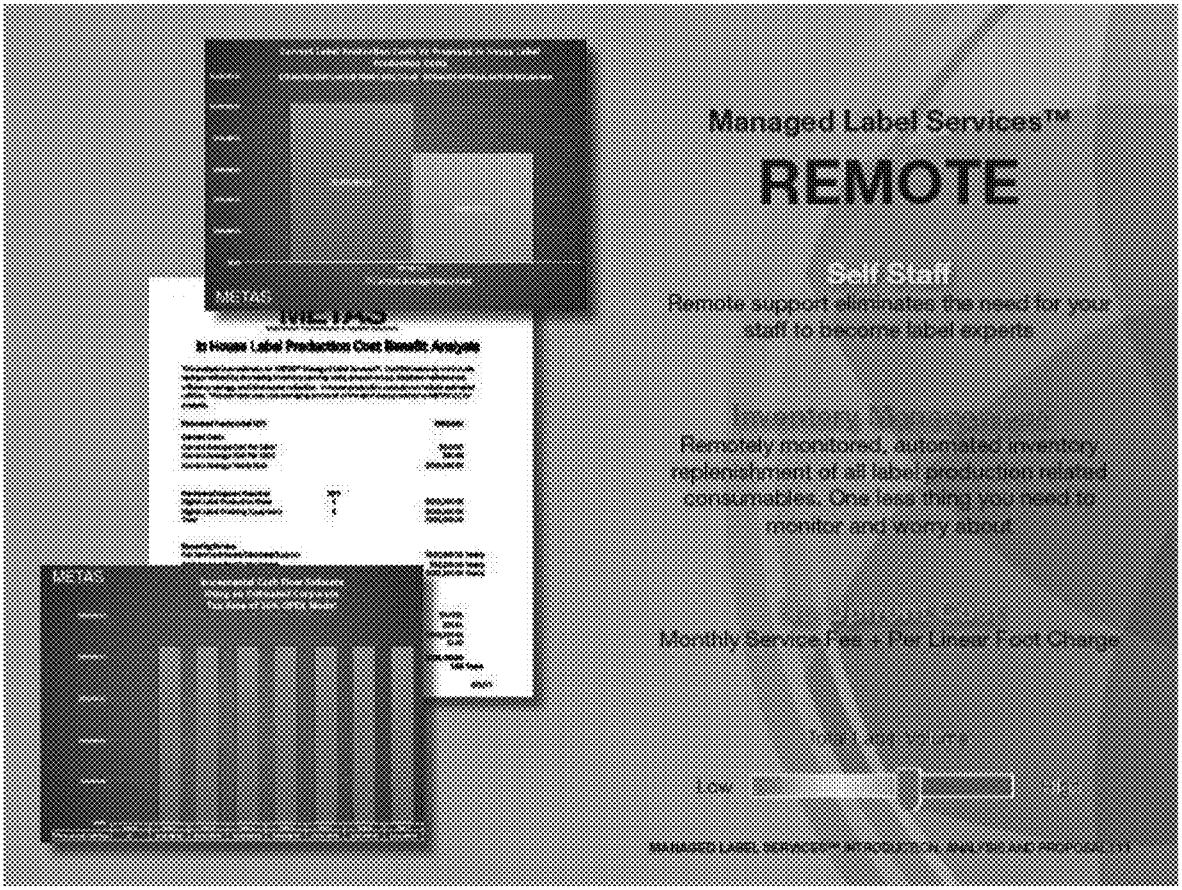
FIG. 9 illustrates the remote advantages of using a managed label services program over traditional services.
Figure 10:
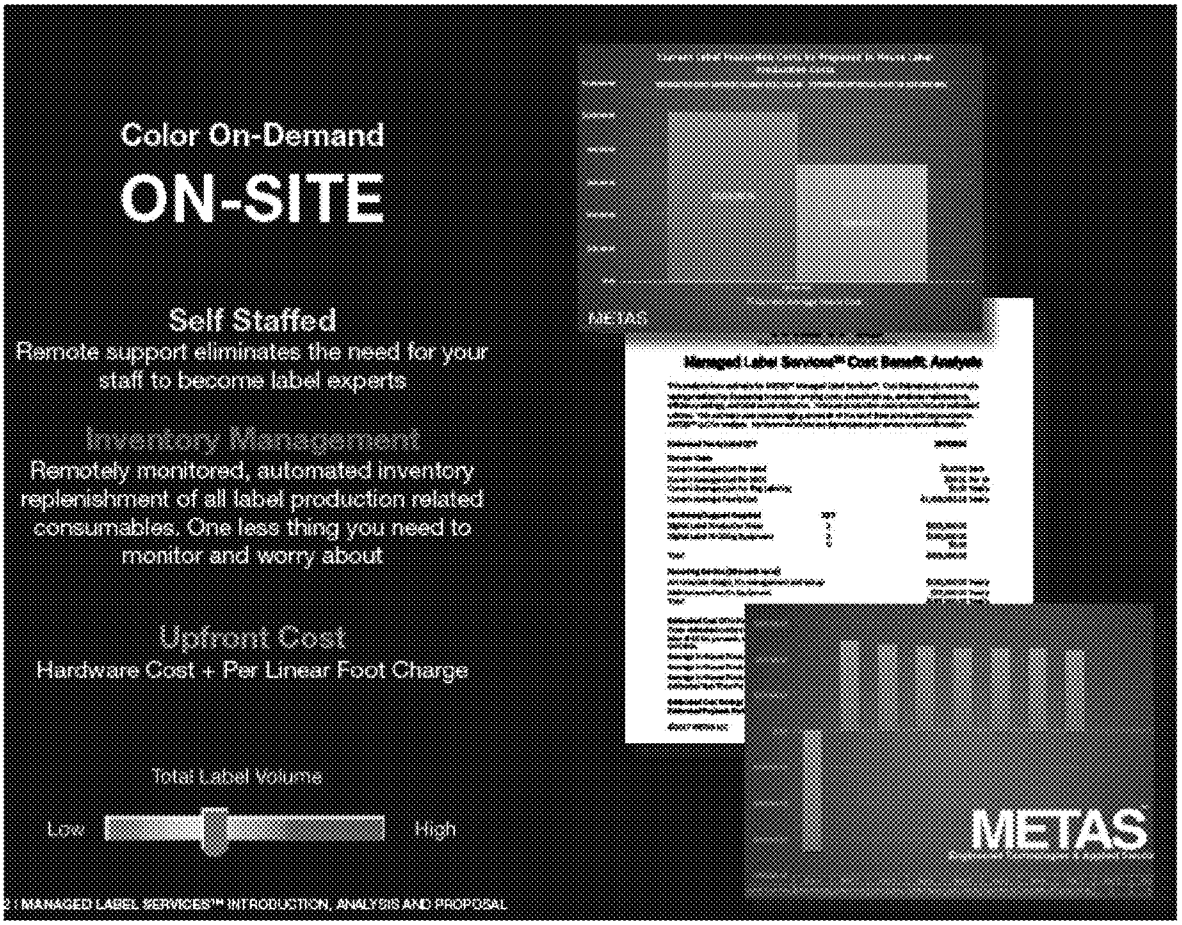
FIG. 10 illustrates advantages of using a managed label services program.
Figure 11:
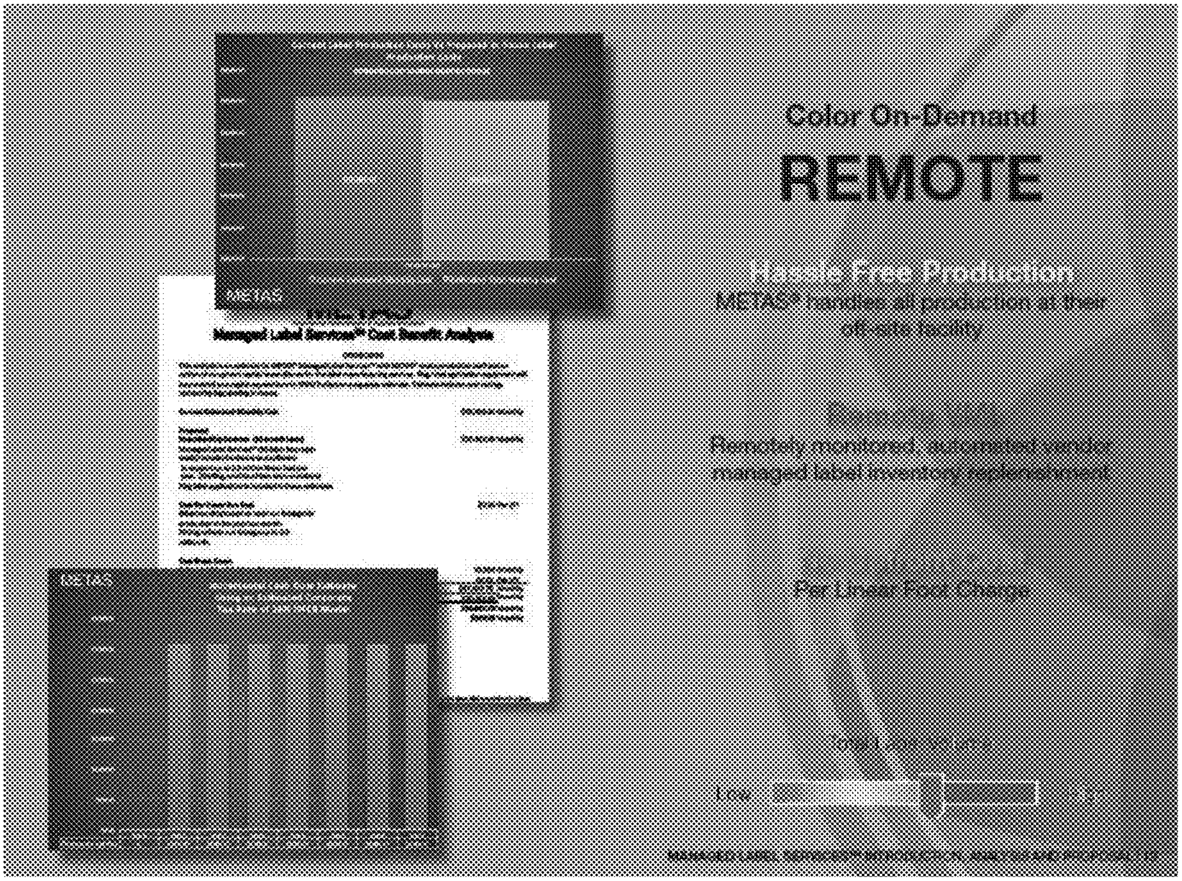
FIG. 11 illustrates advantages of using a managed label services program.

FIG. 7 sets forth the proposal phase, which includes presenting the client with multiple solutions to streamline their label production operations and reduce costs. The client is provided with advantages and disadvantages of each proposed solution.

FIGS. 8-11 provide descriptions of various features and advantages of a managed label services program and color on demand programs. The managed label services program includes both on site and remote assistance for clients. The remote assistance may help to reduce costs while still monitoring inventory and educating client staff. The color on demand program may also provide both on site and remote assistance for clients to help with their label printing related needs, including automated inventory replenishment for all label printing related consumables, such as ink and print media. The color on demand program may use unique pricing formulas to both reduce costs and waste, such as per linear foot charges for labeling.

Figure 12:
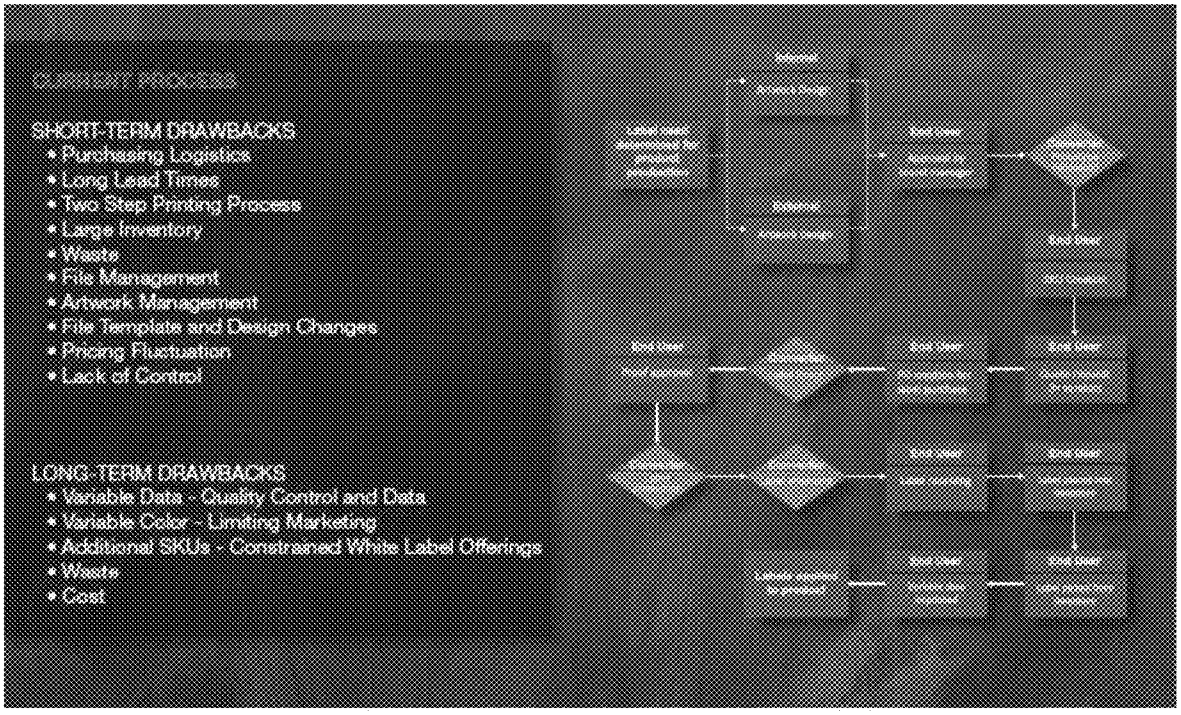
FIG. 12 illustrates a flowchart of label management and procurement processes in the prior art, not under a managed label services program.
Figure 13:
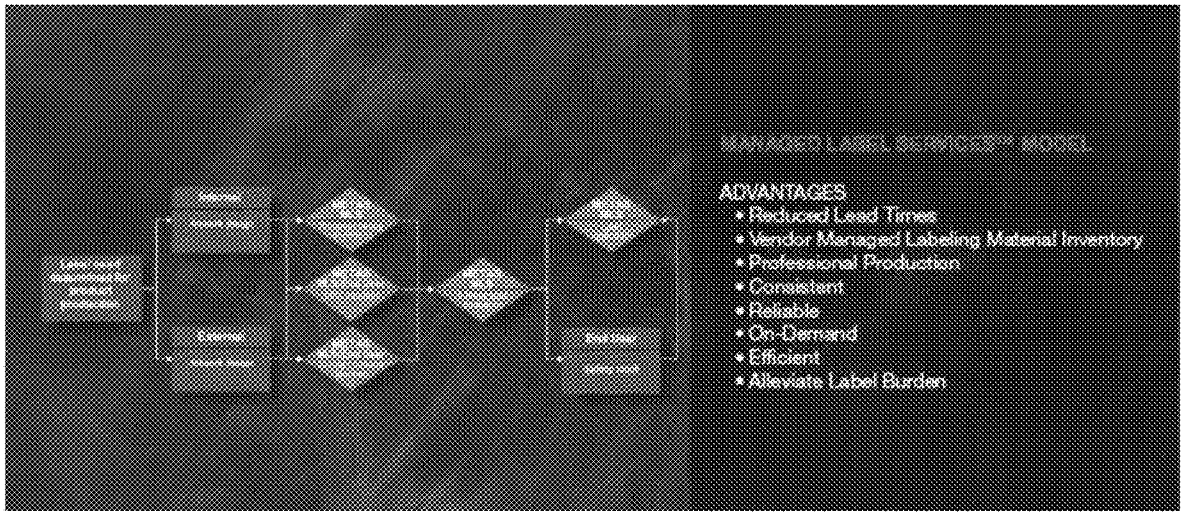
FIG. 13 illustrates a flowchart of label management using a managed label services program.
Figure 15:
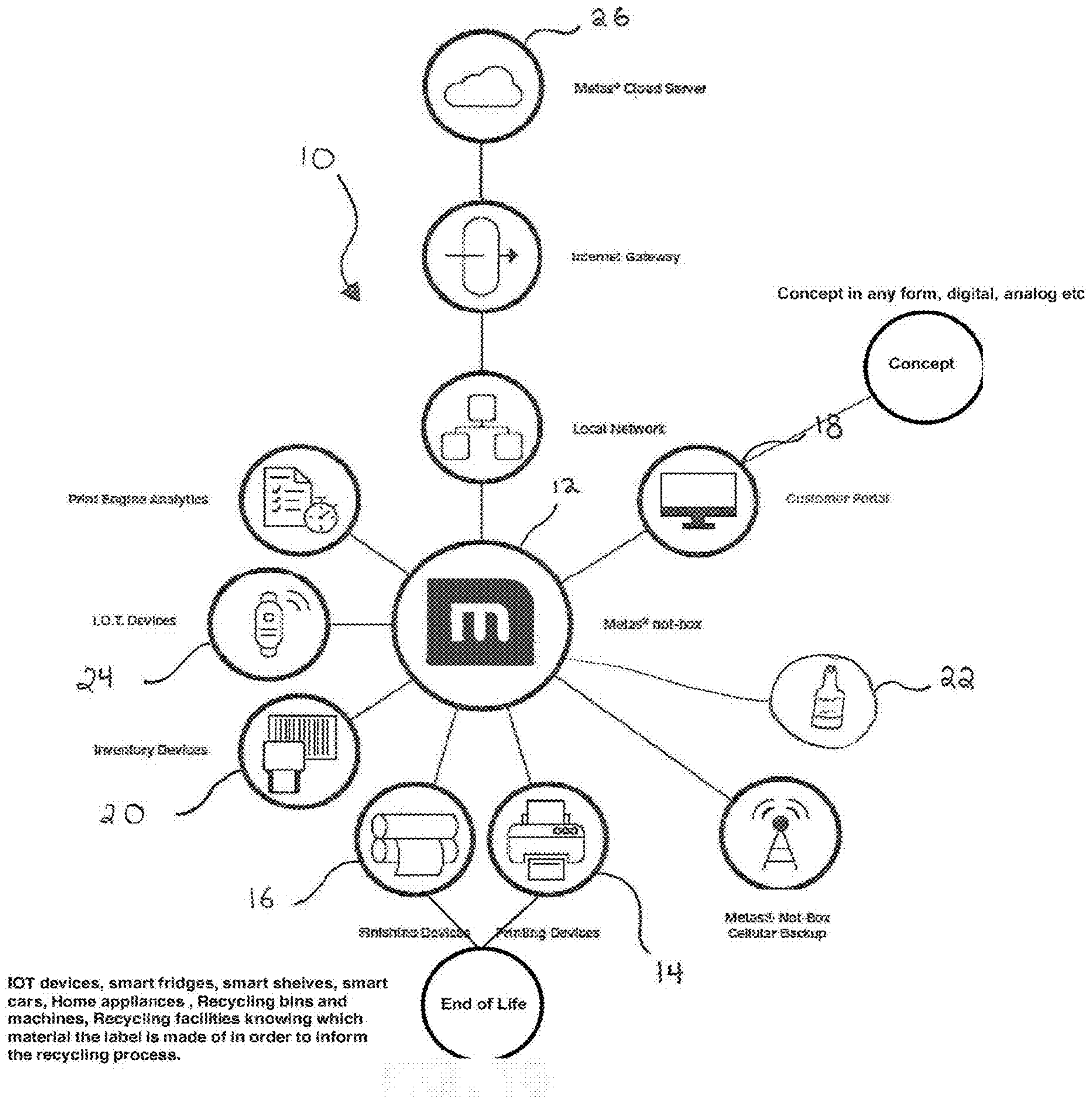
FIG. 15 illustrates a system diagram of a label printing network.

FIGS. 12 and 13 provide a comparison of workflow between previously used programs and a managed label services program. FIG. 12 includes a workflow diagram for previously used methods and a list of short term and long term drawbacks for such methods. FIG. 13 provides the streamlined work flow process for a managed label services program and a list of advantages in using the managed label services program.

FIG. 14 provides a summary of the advantages of using a managed label services program, including better control, reduced costs and waste, and streamlined workflow.

The system and methods described above may be realized in numerous different embodiments, such as those set forth below and shown and described in FIGS. 16-20. The systems described herein may provide specific and unique benefits when utilized by end users who previously required off site label creation, production, and finishing.

Figure 16:
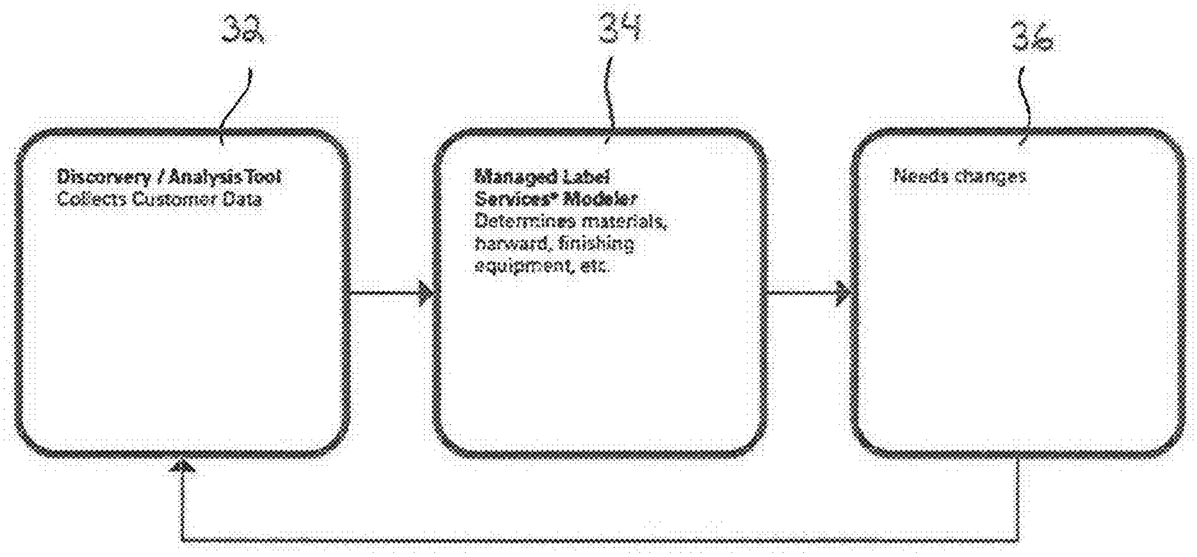
FIG. 16 illustrates process steps for determination of components and products for a label printing system.

In an embodiment illustrated in FIG. 16, a label printing network 10 is provided. The label printing network 10 10 may be generally configured to monitor, integrate, manage, and control various label printing components, as well as manage and monitor, inventories, receive additional data, and optimize label production, as described in further detail below.

The label printing network 10 may include a central processing unit 12, sometimes referred to as a not-box, CPU, or central computer. The CPU 12 may comprise a storage, memory, and processor as well as other computing and networking components. For example, the CPU 12 may comprise a stand-alone computer, or may comprise software or hardware or a combination thereof connected to or running on a computer.

The CPU 12 may be connected to one or more label printing components of the label printing network 10. For example, the CPU 12 may be connected to a print engine 14 and/or a finishing machine 16 to send label production jobs to each machine and receive appropriate feedback and information. The print engine 14 may be any appropriate label print engine configured to receive a label media and print an appropriate label on the label media. The finishing machine 16 may be any appropriate machine configured to receive a printed label on label media and to apply appropriate finishings, such as coatings, die cuts, waste removal, and the like.

It will be appreciated that the CPU 12 may be connected to components of the label printing network 10 through any appropriate connection. For example, components such as the print engine 14 or finishing machine 16 may be connected to the CPU 12 by a direct physical connection, or by a remote connection, such as through a wireless or network connection. Alternatively, the CPU 12 may be housed at a separate location than the components of the label printing network 10. For example, a print engine 14 and finishing machine 16 may be housed at a customer location to enable on-site label printing and finishing for a customer/end user. The print engine 14 and finishing machine 16 may in remote communication with an off-site CPU 12, such as over an internet or other network connection, to allow the CPU 12 to receive information from the print engine 14 and finishing machine 16 and send them label production jobs, as needed.

The CPU 12 may include necessary hardware and software to convert a user art file to a raster graphic image or formatted digital data, capable of being sent to a print engine 14 for printing. The CPU 12 may be capable of receiving an art file from a user, such as through a user portal 18. The user portal 18 may comprise any appropriate user interface, such as a personal computer, mobile device, or the like. The user portal 18 may be in direct communication with the CPU 12 over one or more connection protocols, such as a direct physical connection, wireless connection, network connection, or any other known communication connections. The art file may comprise any appropriate art file or any data related to a new label concept containing label image data, such as a PDF file or the like. The CPU 12 may be configured to receive the art file and convert it to a bit map e that may be read and used by the print engine 14 in printing appropriate labels.

The CPU 12 is not limited to generating labels based on art files directly input from a user, but may receive any input into the system to read a label concept and generate or produce a corresponding label or labels. For example, as illustrated in FIG. 16, the CPU 12 may be informed of a label concept, such as through communication with the portal 18, by communication with a smart document or smart device, through an email interaction, through communications generated through artificial intelligence, or through other means different than direct input of a user art file through the portal 18.

Once formatted digital data is created the CPU 12 may perform pre-press operations to create a label production job for use with components of the label printing network 10. These pre-press operations may include selection of media to be used, determination of quantity of images to be printed in a given spacing, spacing of images on media, selection of inks and colors, other layout considerations, and other printing and finishing considerations. In performing pre-press operations and making the above determinations, the CPU 12 may access known information, such as information on available stored databased, as well as information received from components of the label printing network 10. The information that may be considered when creating the label production job may include available media options, status and timing of inventory in connected inventory systems 20, available print engines 14 within the network 10, available finishing machines 16 within the network 10, characteristics of the applicator machines 22 to be used in the label application, and any other information available to the label printing network 10.

The CPU 12 may further interface with appropriate components of the label printing network 10 to determine a print schedule. The print schedule may take into account availability of machines for use, time to print, and availability of resources, such as media, ink, and the like. The print schedule may determine order of operations, and an order and timing for labels to be printed at an end user location.

The CPU 12 may be configured to optimize a label production job. For example, the CPU 12 may perform pre-press operations to generate a label production job that is optimized to reduce waste, reduce the total amount of ink used, reduce time, and reduce power consumption. These advantages may be realized by evaluating all available options within the label printing network 10 and determining a set of operations, formats, and materials that provides best overall optimization.

In an embodiment, a user may interface with the CPU 12 to select optimization parameters. For example, a user may provide an input into the CPU 12 to select optimization based on one or more of reduced time, reduced energy, reduced waste, reduced cost, or the like. The CPU 12 may then create a label production job that optimizes the selected characteristic or characteristics.

The CPU 12 may be connected to and configured to receive input information from an inventory system 20. The inventory system 20 may monitor the inventory levels of various media, the various levels of ink, and levels of other consumable products used by the label printing network 10. The consumables may be monitored within an end user facility and/or monitored within the supply chain, such as at supplier facilities, on delivery vehicles, and the like. The CPU 12 may receive inventory information from the inventory system 20 related to timing, such as expected timing of shipment, delivery, or the like. Based on inventory levels and timing information, the CPU 12 may predict inventory levels to manage label print schedules.

In an embodiment, the inventory system 20 may include monitoring of rolled media on machine devices, such as at a print engine 14. For example, the media may be rolled onto a core, such as a smart core. The smart core may include a sensor to determine the amount of print media remaining on a roll of media. This may be determined by sensing the depth or thickness of the media left on the roll, or by sensing rotational movements of the roll to determine how much media has been removed from the roll. The smart roll may convey this information to the label printing network 10 and to the CPU 12, through networked communication, such as a direct input into the system, or through a scanned RFID tag on the smart core that conveys the information with may then be input into the CPU 12.

It will be appreciated that other systems and devices, such as internet of things ("IOT") or internet of everything ("IOE") devices 24 and smart devices, may be connected to the CPU 12 to provide the label printing network 10 with input data and to provide interfacing with and viewing of data and label production jobs within the label printing network 10. Remote viewing devices may also be utilized and viewing devices connected to the label printing network 10 to provide unique viewing summaries for different users. Examples of types of information that may be viewed include: print schedules; job statuses; number of label runs; waste ratios; label media usage; label media inventory status; errors at network devices; and the like. Hosts may be provided with a viewing device that connects to the label printing network 10 and is able to view all of the available data. Customers or end users may be provided with a viewing device with connects to the label printing network 10 and is able to view some or all of the data. Other vendors, such as label media suppliers, may be provided with a viewing device with connects to the label printing network 10 and is able to view a limited amount of the data, such as label media inventory status information.

In an embodiment, a method of printing a label is provided. Label art for the label to be printed may be created by a user and input into a centralized CPU 12. The CPU 12 may process the art file through a rasterized image processor to create a formatted digital data, such as a bitmap, of the label for printing. The CPU 12 may then interface with other components within a network of systems and devices that are local and available to a user to determine an optimized label production job. In determining an optimized label production job, the CPU may consider: the types of print engines 14 connected to the CPU 12 and their related capabilities; speed and power consumption of available print engines 14; ink capabilities and consumption of connected print engines 14; whether white ink is needed in the production job and whether white ink may be printed by given print engines 14; speed of available print engines 14; ink usage of available print engines 14; finishing processes needed to be performed by a finishing machine 16, including cutting, application of finishing coatings, and removal of waste; speed and power consumption of available finishing machines 16; label application and label applicators 22 to be used; timing of applicators; available media; available inks; cost of media and cost of inks; and other information input by a user or known to the CPU 12. Based on the available information, the CPU 12 may generate a label production job that identifies what media will be used, how labels will be printed on the media, the layout of the printed labels, print engine 14 to be used, finishing machine 16 to be used, finishes to be performed, and a schedule for printing the labels. It will be appreciated that the label production job may include any subset of the above label production job characteristics, or may further include additional information related to other processes to be performed on a label, such as label application information.

It will be appreciated that the CPU 12 may receive inputs during the label production process that may inform and alter the process. For example, the CPU 12 may receive information from the inventory system 20 related to available label media or ink needed in a label production. Availability of resources may lead the CPU 12 to alter a print schedule to comply with inventory supply. In another example, other data from devices within the network 10 may inform the CPU 12 as to other conditions, such as service needed, or other information that may lead to changes in an existing label production job. Further, the CPU 12 may receive inputs from sources outside of the network 10, such as inputs from a user related to labeling needs, that may alter a label production job in process. The CPU 12 may be configured to receive any of these inputs and adjust a label production job and production schedules in real time based on all available inputs and data.

As shown in FIG. 16, the CPU 12 may be connected to a cloud or off site database 26, such as through an internet connection, to back up data collected and used by the CPU 12.

With reference to FIGS. 17-20, a system and process for managing label services or MLS 30 is shown. The MLS 30 may generally comprise a system and method for customizing and selecting an appropriate label system for a given customer or end user. The labeling system may be specifically customized for optimized and fully functional on site label production. However, it will be appreciated that any customized system may also include various off site solutions as well that coordinate with the online components of the customized label printing solution.

Figure 17:
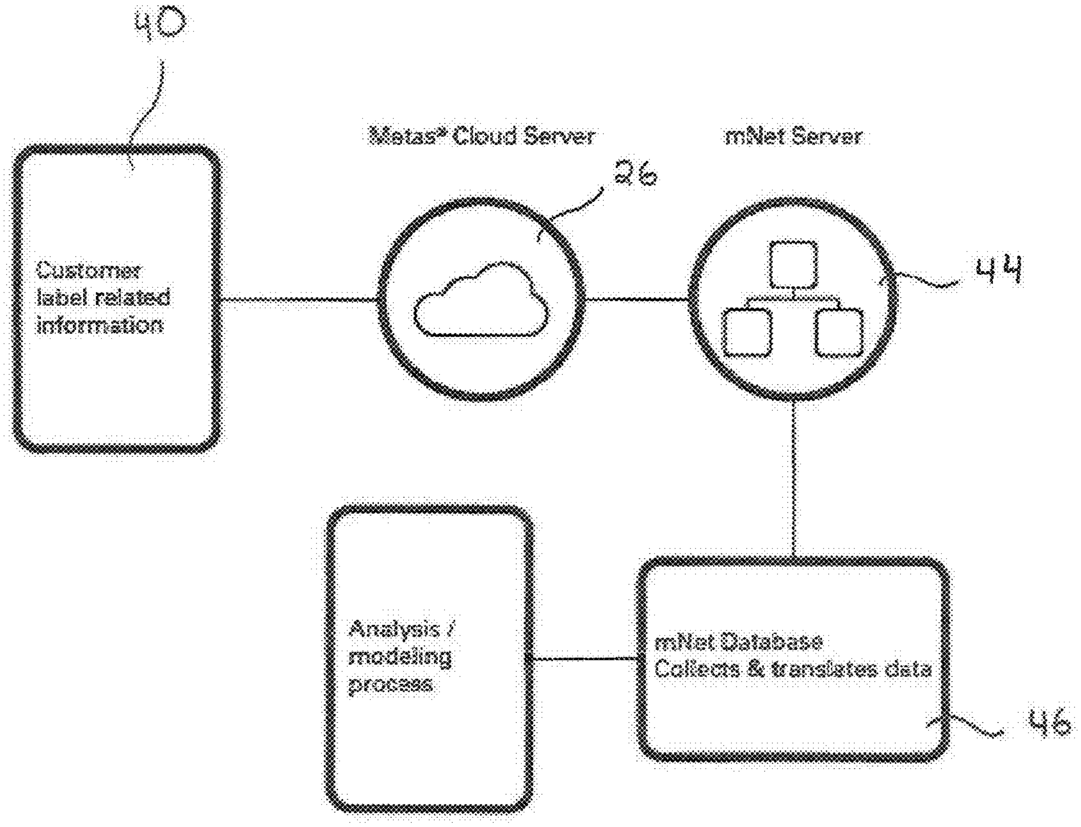
FIG. 17 illustrates a process diagram of sub-steps of the customer label information discovery process.

With reference to FIG. 17, the three primary steps of the MLS process are provided. Each of these steps and the related substeps will be discussed in further details below. In a first step 32, discovery is performed. Discovery is primarily used to determine a customer or end user's labeling needs. In a second step 34, the discovery information is then used to model potential combinations of hardware, media and materials, and other equipment to be used that best fit the customer's needs. In a third step 36, the customer's needs and labeling usage is monitored to determine if additional or different materials, media, or machines are needed.

Figure 18:
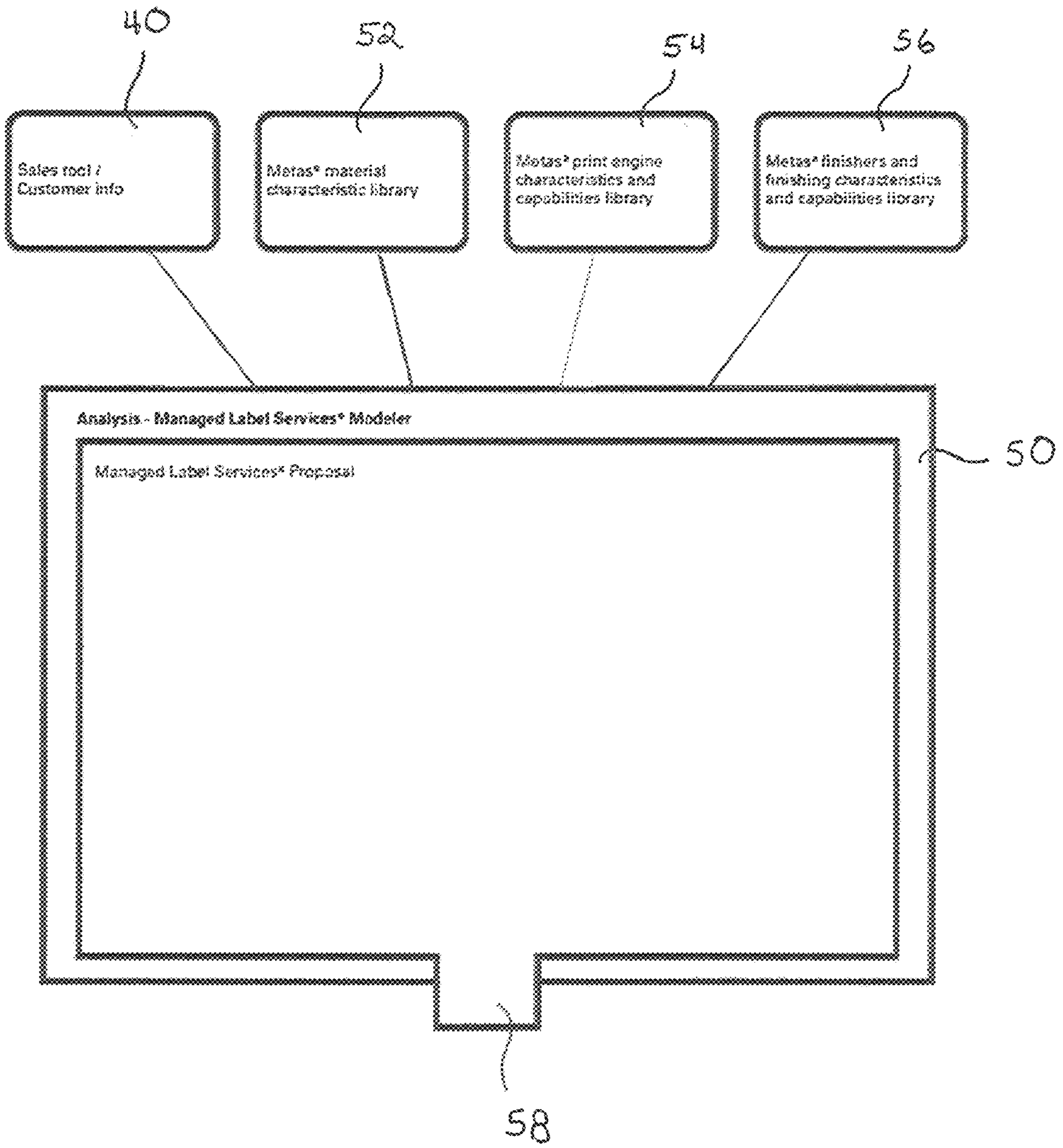
FIG. 18 illustrates a system diagram of a modeler and creation of a proposal.

FIG. 18 further illustrates the discovery step 32, and flow of information that may occur during discovery of customer labeling needs. Customer labeling information 40 may specifically be uploaded to a database 26, such as a cloud server; and may be accessed by a host server 44. The customer labeling information 40 may include any information about the labels to be used or printed by a customer, as well as any limitations or restrictions on hardware, software, or networking. Examples of customer labeling information 40 include: size, width, height, the die line of customer labels to be printed; radius of corners, or the rectangle of special odd shapes for each customer label; ink usage for each customer label including colors, types, and quantities needed; any need for two sided label printing; finished roll diameter and label quantity per roll; when the files are uploaded from the user portal 18; quantity of labels to be printed; material to be used; inks requires for customer colors; total annual labeling spend; power restrictions; and footprint or area restrictions.

The labeling information 40 may be stored in a host database 46 and accessed by a modeler 50 to determine the optimal labeling system for a customer. The modeler 50 may comprise a software, hardware, or combination thereof. The modeler may utilize proprietary algorithms, proprietary lookup tables, as well as automated and manual process steps, as set forth in further detail below.

Figure 19:
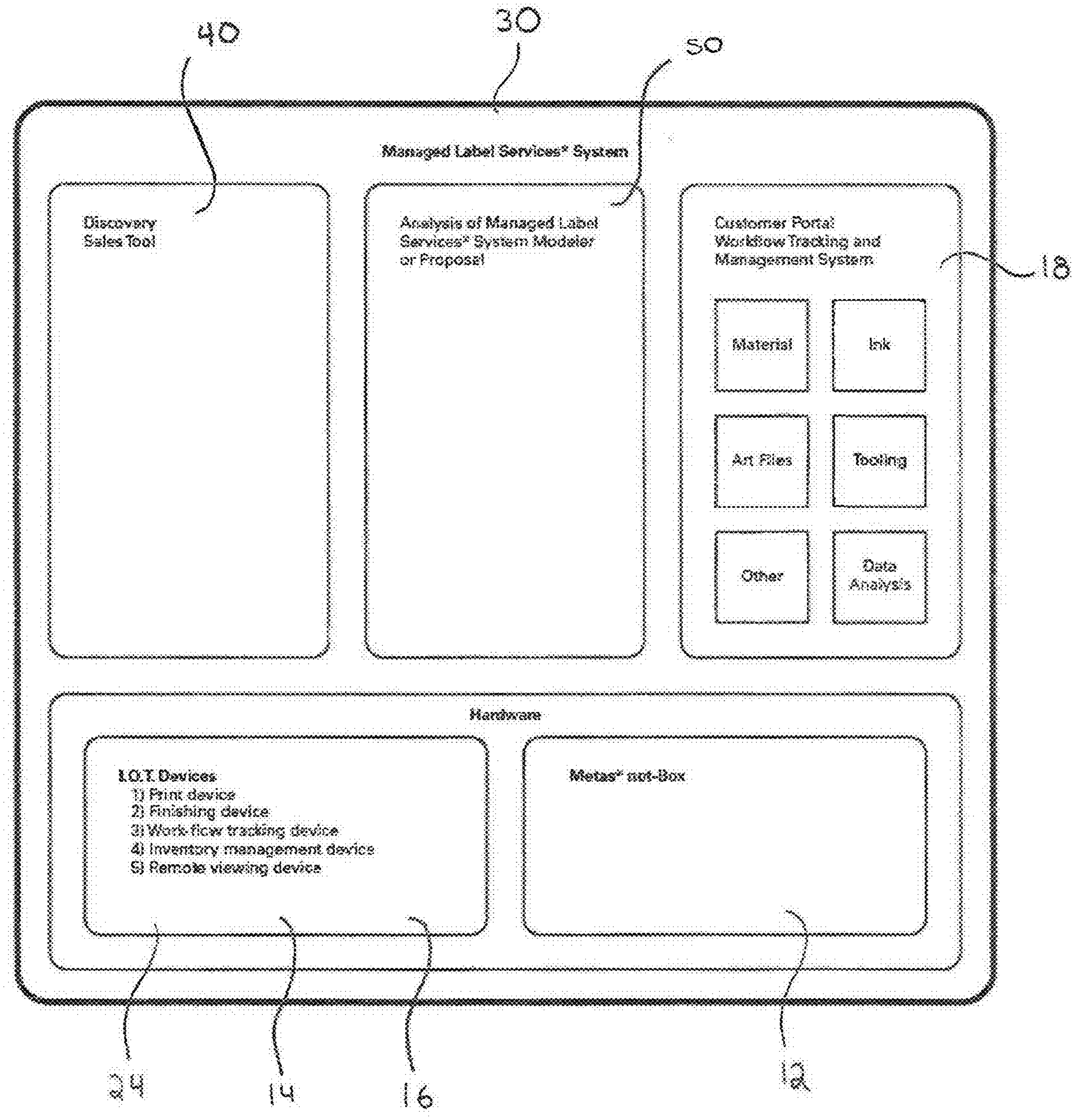
FIG. 19 illustrates a system diagram of a managed label services system.

Information flow for the modeling step 34 is generally shown in FIG. 19. During modeling, the customer label information is used as an input to a modeler, such as a software. In an embodiment, the modeling software may reduce customer label information to measureable numeric values to be used in an algorithm or for comparison to related values.

As shown in FIG. 19, the modeler 50 may first receive all customer label information 40. The modeler 50 may then access other information 52 on known host libraries and databases. The modeler 50 may further access information related to available print engines 54 and information related to available finishers 56 to know the capabilities and technical specifications, cost, speed, power requirements, and other sales and technical data related to each.

The modeler 50 may be configured to analyze the information provided above, and to determine appropriate and optimized options for print media, print engines 14, and finishing machines 16 that meet a customer's needs.

The process of determining optimized print engine 14 options for a given customer may include: considering all available print engines 14; comparing cost, speed, size, and power consumption of available print engines 14 with client cost, speed, size, and power limitations; comparing the label media width minimum and maximum and thickness of all customer labels to be printed with margin and label media size restrictions of available print engines 14; comparing supply costs of print engines 14, namely costs of cutting blades, cores, and other replaceable print engine components, with client label needs; comparing print specific settings needed for production of client labels with available settings on print engines 14, such as xml and json; comparing color capabilities and print resolution of each print engine 14 with client label color and resolution requirements, including the need for white ink or varnish printing; comparing media compatibility with client label media requirements; and comparing capability of given print engines 14 with other devices in the client's label printing network 10.

The process of determining optimized finishing machine 16 options for a given customer may include: considering all available finishing machines 16; comparing cost, speed, size and power consumption of available finishing machines 16 with client cost, speed, size, and power limitations, including the potential need for updates; comparing client label finishing needs with finishing machine 16 capabilities, including any size limitations on finishing machines 16 related to label media compared to client label media sizing needs; comparing media compatibility with client label media requirements; comparing cuts needed on customer labels with available cutting tools on finishing machines 16; consideration of environmental aspects of client labels including where they will be used and deployed, exposure to weather and chemicals, and how long they need to last; and comparing capability of given finishing machines 16 with other devices in the client's label printing network 10.

The process of determining appropriate label media for client labeling needs may include: comparing customer label sizes with available label media sizes; comparing colors in client label art with colors as printed on label media; and comparing compatibility of available label media with other devices in the client's label printing network 10.

The modeler 50 may utilize one or more algorithms to determine optimal hardware and media for a client labeling system. The modeler may reduce information related to the client's labeling needs to numeric values to be used and processed by the algorithm. The modeler 50 may then employ lookup tables and other resources to determine best and optimal matches. It will be appreciated that aspects of the modeling process may be performed manually, while other aspects, or in some embodiments all aspects, may be performed automatically by a software or hardware or combination thereof.

After all available information is received and processed by the modeler 50, the modeler 50 may output one or more proposed print solutions 58 for a user. The proposed print solution ("proposal") 58 may include lists of hardware, label media, consumable and replacement parts, and the like. The modeler 50 may further generate contracts related to each proposal 58. In an embodiment, the modeler 50 may utilize all available information related to hardware and label media in a proposal 58 to determine pricing on a per foot basis. Specifically, the contract may wrap some or all of an end user's costs into a single price per foot of label printing that encompasses all costs with a generated label print solution.

FIG. 20 illustrates a system diagram of the MLS 30. The modeler 50 is fed information from both the discovery tools 40 as well as directly from the user portal 18. The user portal 18 may specifically provide the modeler 50 with information on materials used, ink usage, tooling needed for end cuts, art files, and other information and analysis. The modeler 50 may access information from the label printing network 10 through the CPU 12, such as any information on available connected devices 24, including any print engines 14 or finishing devices 16.

In an embodiment, the MLS 30 may be configured to track data related to the system 30 and network 10. For example, the CPU 12 may gather, such as in real time or through periodic communications, information on connected hardware including the print engine 14 and finishing machine 16. The data gathered may include cycle times, types of labels printed or finished, error codes, down time, maintenance tasks performed, use of tooling, use of label media, use of inks, service time, waste removal; and other information related to use of the hardware. The CPU may further gather data from other devices on the network, including the inventory system 20 and other IOT/IOE and smart devices 24. The CPU 12 may specifically receive data from the inventory system 20 at various points along the supply chain. These may include levels of inventory of label media and other inventory items within a client facility; inventory levels at a supplier; delivery timing and status information of inventory; inventory prices including real time fluctuations in inventory prices, wholesale prices, and price histories. The CPU 12 may further gather sales and cost information related to hardware on the system, such as machine cost, replacement part costs, and service costs for print engines 14 and finishing machines 16. The CPU 12 may further track label information downstream within the sales process. For example, IOT/IOE devices 24 may be connected to a network at a store location and may scan or read barcodes or other readable information on labels printed by a customer. The labels 24 may be read to Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, we claim:

1. A label production system optimized for deployment at a user location, the label printing system comprising:

a label print engine configured to receive formatted digital data related to a label and print the related label on media;

a finishing machine configured to receive a printed label from the label print engine and perform a finishing task on one or more printed labels; and a central processor connected to the label print engine and the finishing machine and configured to send label print and finishing information to the label print engine and the finishing machine respectively, the central processor configured to create creating an optimized label production job to be sent to the print engine and finishing machine, the optimized label production job based on:

characteristics of any print engines connected to the central processor, including speed, and power consumption characteristics;

ink consumption of any print engines connected to the central processor;

finishing processes needed to be performed by a finishing machine, including cutting, application of finishing coatings, and removal of waste;

speed and power consumption of a finishing machine connected to the central processor;

availability and cost of media in an inventory system; and availability and cost inks in the inventory system;

the central processor is connected to the inventory system and wherein the inventory system is configured to communicate label media inventory levels to the central processor, the inventory system is configured to monitor inventory levels both at a user location and off site including at various points along the supply chain, the inventory system is configured to inform the central processor of variable data points including but not limited to inventory levels throughout the supply chain;

and wherein the optimized label production job is configured to optimize time, cost, waste, design, construction, and power consumption;

wherein the central processor receives the art file and generates formatted digital data based on the art file to be sent to the print engine for printing of a label based on the art file.

2. The label production system of claim 1, wherein the label print engine and finishing machine are connected to the central processor by one or more connection protocols.

3. The label production system of claim 1, wherein the central processor is configured to create the optimized label production job based on at least one of:

characteristics of any print engines connected to the central processor, including speed, and power consumption characteristics;

ink consumption of any print engines connected to the central processor;

finishing processes needed to be performed by a finishing machine, including cutting, application of finishing coatings, and removal of waste;

speed and power consumption of a finishing machine connected to the central processor;

availability and cost of media in an inventory system; and availability and cost inks in an inventory system.

4. The label production system of claim 1 further comprising one or more viewing devices connected to the printing system, wherein the viewing devices are configured to view summaries of data and information gathered by the central processor.

5. A label production system optimized for deployment at a user location, the label printing system comprising:

a label print engine configured to receive formatted digital data related to a label and print the related label on media;

a finishing machine configured to receive a printed label from the label print engine and perform a finishing task on one or more printed labels; and a central processor connected to the label print engine and the finishing machine and configured to send label print and finishing information to the label print engine and the finishing machine respectively, the central processor configured to create an optimized label production job to be sent to the print engine and finishing machine, and wherein the optimized label production job is configured to optimize time, cost, waste, design, construction, and power consumption, the optimized label production job based on:

characteristics of any print engines connected to the central processor, including speed, and power consumption characteristics;

ink consumption of any print engines connected to the central processor;

finishing processes needed to be performed by a finishing machine, including cutting, application of finishing coatings, and removal of waste;

speed and power consumption of a finishing machine connected to the central processor;

availability and cost of media in an inventory system; and availability and cost inks in the inventory system;

the central processor is connected to the inventory system and wherein the inventory system is configured to communicate label media inventory levels to the central processor, the inventory system is configured to monitor inventory levels both at a user location and off site including at various points along the supply chain, the inventory system is configured to inform the central processor of variable data points including but not limited to inventory levels throughout the supply chain;

wherein the central processor is configured to receive the art file and generate formatted digital data based on the art file to be sent to the print engine for printing of a label based on the art file.

* * * * *